(12) United States Patent
Richter et al.

(10) Patent No.: US 7,786,245 B2
(45) Date of Patent: Aug. 31, 2010

(54) PROCESS FOR PREPARING POLYARYLENE ETHER KETONE

(75) Inventors: Alexander Richter, Oer-Erkenschwick (DE); Vera Schiemann, Marl (DE); Bernd Günzel, Haltern am See (DE); Boris Jilg, Bochum (DE); Wilfried Uhlich, Marl (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 11/747,980

(22) Filed: May 14, 2007

(65) Prior Publication Data

US 2007/0265415 A1 Nov. 15, 2007

(30) Foreign Application Priority Data

May 13, 2006 (DE) .................. 10 2006 022 442

(51) Int. Cl.
*C08G 8/02* (2006.01)
*C08G 14/00* (2006.01)

(52) U.S. Cl. ....................................... 528/125

(58) Field of Classification Search .................. 528/125
See application file for complete search history.

(56) References Cited

U.S. PATENT DOCUMENTS

| | | | |
|---|---|---|---|
| 4,656,220 A | | 4/1987 | Jadamus et al. |
| 4,711,945 A | * | 12/1987 | Daniels .................. 528/86 |
| 4,774,311 A | * | 9/1988 | Kelsey .................. 528/125 |
| 5,258,491 A | * | 11/1993 | Agreda et al. .......... 528/495 |
| 5,290,906 A | * | 3/1994 | Matsumura et al. ......... 528/125 |
| 2005/0010015 A1 | * | 1/2005 | Zhang et al. .................. 528/125 |
| 2006/0134419 A1 | | 6/2006 | Monsheimer et al. |

FOREIGN PATENT DOCUMENTS

| | | |
|---|---|---|
| DE | 42 07 555 A1 | 9/1993 |
| EP | 0 001 879 A1 | 5/1979 |
| EP | 0 182 648 A2 | 5/1986 |

OTHER PUBLICATIONS

U.S. Appl. No. 11/722,261, filed Jun. 20, 2007, Richter et al.
U.S. Appl. No. 11/746,718, filed May 10, 2007, Richter et al.
U.S. Appl. No. 11/813,881, filed Jul. 13, 2007, Richeter et al.

* cited by examiner

*Primary Examiner*—Mark Eashoo
*Assistant Examiner*—Liam J Heincer
(74) *Attorney, Agent, or Firm*—Oblon, Spivak, McClelland, Maier & Neustadt, L.L.P.

(57) ABSTRACT

A process for preparing a polyarylene ether ketone, comprising:
  a) reacting an aromatic dihalogen compound with a bisphenol and/or a halophenol in the presence of alkali metal carbonate and/or alkaline earth metal carbonate in a high-boiling aprotic solvent to give a polyarylene ether ketone,
  b) wet-comminuting the solidified reaction mixture in the presence of water,
  c) washing with an organic solvent,
  d) washing with water and
  e) drying the washed product,
wherein the wet-comminuted reaction mixture is fed to the two-stage washing with a residual moisture content of at least 1% by weight,
  which process leads to distinctly reduced residual contents of salts and reaction solvents.

17 Claims, No Drawings

PROCESS FOR PREPARING POLYARYLENE ETHER KETONE

BACKGROUND OF THE INVENTION

1. Field of the Invention

The present invention provides a process for working up the reaction mixture which is obtained in the preparation of polyarylene ether ketones (PAEK) by the so-called nucleophilic route, with isolation of pure PAEK.

2. Description of the Related Art

The preparation of PAEK by nucleophilic polycondensation of bisphenols and organic dihalogen compounds in a suitable solvent using alkali metal carbonates or alkaline earth metal carbonates is a known process which is described in a multitude of patent applications, for example in EP A 0 001 879, EP A 0 182 648 and EP A 0 244 167. When this process is performed, the end of the polycondensation is always followed by a very complicated washing of the reactor effluent. The washing has the aim of removing the reaction solvent, inorganic salts, residual monomers and other compounds from the PAEK. In the course of development studies on PAEK, it has been found that it is advantageous for the process and the product properties when the organic dihalides used are difluoro compounds. However, a disadvantage of the use of difluoro compounds is the formation of sparingly soluble alkali metal or alkaline earth metal fluorides as by-products during the reaction. Moreover, for the solution polycondensation, a suitable solvent has to be present in comparatively large amounts, based on the overall reaction mixture, in order to keep the polymer formed in solution even in the case of relatively high molar masses. For this use, the literature recommends diphenyl sulfone in the vast majority of cases.

By their nature, the abovementioned by-products and the diphenyl sulfone solvent present difficulties in the work-up of the reaction product. All substances other than the polymer have to be removed from the PAEK by complicated washing in various solvents (EP A 0 244 167, EP A 0 182 648, EP A 0 297 363, EP A 0 322 151). These washes correspond additionally to a solid-liquid extraction, since the by-products and the solvent are not only present around but also within the solid polymer; depending on temperature, granule size of the reactor effluent, type of solvent, etc., they require a very large amount of time and large amounts of wash solvent.

In order to separate the PAEK from the by-products and the solvent, two-stage wash processes are typically used. In the first wash step, for example with ethanol, the diphenyl sulfone is removed from the reaction mixture and, in the second wash step with water, the salt-type by-products, generally NaF and KF. According to the prior art, the reactor effluent to be washed is dried in order not to introduce large amounts of water into the wash ethanol. Typically, the individual wash steps proceed at standard pressure and temperatures just below the boiling point of the solvents used. However, a disadvantage is that the residual content of sodium, potassium and diphenyl sulfone can be reduced only insufficiently by the process described, which is disadvantageous for some applications in the electronics industry.

Improved two-stage wash processes are known, with which the residual content of impurities can be reduced even further. Here, the individual wash steps are carried out under elevated pressure, since the solvents are heated above their boiling point. However, these processes are afflicted with the disadvantage that the apparatus configuration is very complicated owing to working at elevated pressure.

SUMMARY OF THE INVENTION

It is an object of the present invention to develop an improved wash process with which the residual contents of salts and reaction solvents (generally diphenyl sulfone) can be reduced distinctly, without having to accept the apparatus complexity which is needed in washing processes in the elevated pressure range.

This object is achieved by a process for preparing a polyarylene ether ketone, containing the following steps:
  a) reacting an aromatic dihalogen compound with a bisphenol and/or a halophenol in the presence of alkali metal carbonate and/or alkaline earth metal carbonate in a high-boiling aprotic solvent to give a polyarylene ether ketone,
  b) wet-comminuting the solidified reaction mixture in the presence of water,
  c) washing with an organic solvent,
  d) washing with water and
  e) drying the washed product, steps c) and d) being referred to herein as two-stage washing, wherein the wet-comminuted reaction mixture is fed to the two-stage washing with a residual moisture content of at least 1% by weight.

DESCRIPTION OF THE PREFERRED EMBODIMENTS

The wet-comminuted reaction mixture is fed to the two-stage washing with a residual moisture content of at least 1% by weight, preferably at least 2% by weight, more preferably at least 3% by weight, even more preferably at least 4% by weight, and most preferably at least 5% by weight.

Examples of suitable aromatic dihalogen compounds are 4,4'-difluorobenzophenone, 4,4'-dichlorobenzophenone, 4,4'-dichlorodiphenyl sulfone, 4,4'-difluorodiphenyl sulfone, 1,4-bis(4-fluorobenzoyl)benzene, 1,4-bis(4-chlorobenzoyl)benzene, 4 chloro-4'-fluorobenzophenone and 4,4'-bis(4-fluorobenzoyl)biphenyl. The halogen group is generally activated by a para-carbonyl or sulfonyl group. In the case of a para-carbonyl group, the halogen is chlorine or preferably fluorine; in the case of a para-sulfonyl group, the halogen may be fluorine or chlorine, although the preferred halogen here is generally chlorine owing to sufficient reactivity and lower costs. It is also possible to use mixtures of different dihalogen compounds.

Examples of suitable bisphenols are hydroquinone, 4,4'-dihydroxybenzophenone, 4,4'-dihydroxydiphenyl sulfone, 2,2'-bis(4-hydroxyphenyl)propane, 4,4'-dihydroxybiphenyl, bis(4-hydroxyphenyl)ether, bis(4-hydroxyphenyl)thioether, bis(4-hydroxynaphthyl)ether, 1,4-, 1,5- or 2,6-dihydroxynaphthalene, 1,4-bis(4-hydroxybenzoyl)benzene, 4,4'-bis(4-hydroxybenzoyl)biphenyl, 4,4'-bis(4-hydroxybenzoyl)diphenyl ether or 4,4'-bis(4-hydroxybenzoyl)diphenyl thioether. It will be appreciated that it is also possible to use mixtures of different bisphenols.

Examples of suitable halophenols are 4-(4'-chlorobenzoyl)phenol and 4-(4'-fluorobenzoyl)phenol. With regard to the selection of the halogen, the same criteria apply as for the dihalogen compounds. It will be appreciated that it is also possible to use mixtures of different halophenols or mixtures of halophenols with a 1:1 mixture of aromatic dihalogen compound and bisphenol.

Suitable alkali metal and alkaline earth metal carbonates and hydrogencarbonates derive from lithium, sodium, potassium, rubidium, cesium, magnesium, calcium, strontium or barium. Typically, in accordance with the prior art, a mixture of sodium carbonate and potassium carbonate is used.

According to the prior art, the high-boiling aprotic solvent is preferably a compound of the formula

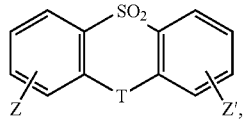

where T is a direct bond, one oxygen atom or two hydrogen atoms; Z and Z' are each hydrogen or phenyl groups. It is preferably diphenyl sulfone.

The PAEK contains units of the formulae

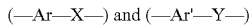

where Ar and Ar' are each a divalent aromatic radical, preferably 1,4-phenylene, 4,4'-biphenylene, and 1,4-, 1,5- or 2,6-naphthylene. X is an electron-withdrawing group, preferably carbonyl or sulfonyl, while Y is another group, such as O, S, $CH_2$, isopropylidene or the like. In this case, at least 50%, preferably at least 70% and more preferably at least 80% of the X groups should be a carbonyl group, while at least 50%, preferably at least 70% and more preferably at least 80% of the Y groups should consist of oxygen.

In the especially preferred embodiment, 100% of the X groups consist of carbonyl groups and 100% of the Y groups of oxygen. In this embodiment, the PAEK may, for example, be a polyether ether ketone (PEEK; formula I), a polyether ketone (PEK; formula II), a polyether ketone ketone (PEKK; formula III) or a polyether ether ketone ketone (PEEKK; formula IV), but other arrangements of the carbonyl and oxygen groups are of course also within the terms of the embodiments of the invention.

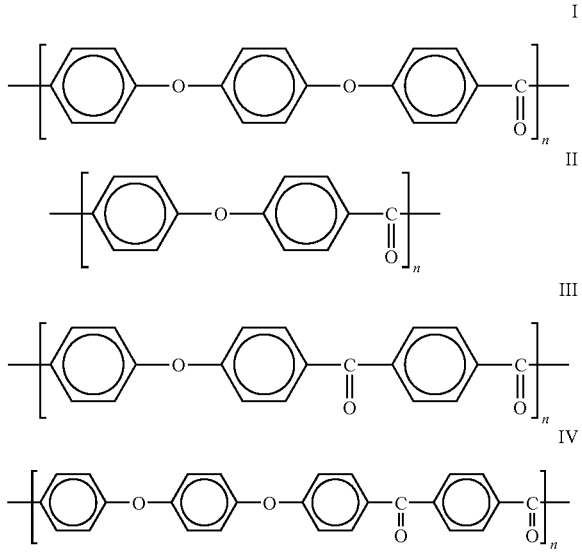

The PAEK is generally partly crystalline, which is manifested, for example, by finding, in the DSC analysis, a crystal melting point $T_m$ which in most cases is in the order of magnitude of around 300° C. or higher. However, the teaching of the invention can also be applied to amorphous PAEK. In general, it is the case that sulfonyl groups, biphenylene groups, naphthylene groups or bulky Y groups, for example an isopropylidene group, reduce crystallinity.

Owing to the given reactivity of the functional groups and the low solubility of the PAEK at relatively low temperatures, the reaction is typically carried out within the temperature range from approximately 200 to 400° C., preference being given to the range from approximately 250 to 350° C. Further details of the performance of the reaction can be taken from the abovementioned prior art.

After performing the reaction, the reaction mixture is discharged from the reactor. The discharged reaction mixture is cooled with sprayed and/or flowing water and, after solidifying, transferred in water-moist form into a comminution apparatus. This may, for example, be a breaker, a crusher, a mill or a dispersion unit. The breakers, crushers, mills and dispersion units used may be all of those which are known to the person skilled in the art; for example, reference is made to Vauck/Müller, Grundoperationen chemischer Verfahrenstechnik [Basic Operations of Chemical Process Technology], 10th Edition, Chapter 5.1. (Zerkleinern [Comminution]), Deutscher Verlag für Grundstoffindustrie, Leipzig 1994. For example, it is possible to use jaw crushers, round crushers, roll crushers or impact crushers for a comminution to diameter from about 0.5 to 50 mm, or impact mills, roll mills, hammer mills, ball mills, vibratory mills, cutting mills or jet mills or dispersion units for a comminution to from about 50 to 500 μm.

The comminuted water-moist reactor effluent is optionally subsequently initially dried, for example by pressing, centrifugation, washing off some of the residual moisture with, for example, ethanol or with the aid of another suitable measure, and brought to the residual moisture content according to the embodiments of the present invention. Subsequently, it is fed to the two-stage wash process. Appropriately, the upper limit for the residual moisture content is 30% by weight, 25% by weight, 15% by weight, 12% by weight or 10% by weight.

In both stages of the two-stage wash process, it is possible to wash either batchwise in a stirred tank or in a stirred suction filter (referred to hereinafter as "slurry washing") or continuously in the form of a drainage wash, a compact filter cake being flowed through continuously by a solvent.

In the first stage, an organic solvent, for example acetone, methyl ethyl ketone, methyl isobutyl ketone, methanol, ethanol, isopropanol, n- or iso-butanol, 2 methoxyethanol, 1,2-dimethoxyethane, tetrahydrofuran, ethyl acetate, benzene, toluene, xylene and mixtures thereof is used for washing. However, it is also possible in principle to use any other suitable organic solvent.

In the second stage, water is used for washing, in order to remove the salts.

If washing is effected batchwise in one or in both stages, the washing is carried out from approximately 5 to 15 times in total in each case. When fewer wash steps are carried out, the purification of the product may be insufficient. When, in contrast, more washing steps are carried out, the process overall becomes very costly and inconvenient. If washing is effected at relatively high temperature under pressure, however, only a few wash steps, for example 1, 2, 3 or 4 wash steps, may be sufficient.

According to the prior art, the water wash may include a wash with a dilute acid, for instance hydrochloric acid, sulfuric acid, orthophosphoric acid or in particular pyrophosphoric acid, polyphosphoric acid, metaphosphoric acid or phosphonic acid (DE 42 07 555 A1). The acid is used here in a concentration of from approximately 0.1 to 5% by weight. In addition to an extraction of inorganic constituents improved even further, this achieves improved melt stability of the PAEK.

After the wash, the PAEK is dried. It can then be used directly in this form, for example as a coating material, but it may also be granulated and, if desired, processed to compounds by addition of further substances, such as fillers, pigments, stabilizers, other polymers, processing assistants and the like. Suitable compounds, their production and use are known to those skilled in the art.

The PAEK obtained in accordance with the invention features a particularly low content of inorganic constituents and solvent residues. It is suitable particularly for end uses in the electronics industry, and also wherever the surface quality of moldings plays a role.

The invention will be illustrated by way of examples hereinafter, although the invention is not intended to be limited to the examples.

Preparation of PEEK:

At 60° C., 69.2 g of diphenyl sulfone, 26.2 kg of 4,4'-difluorobenzophenone, 13.2 kg of hydroquinone, 13.2 kg of sodium carbonate and 640 g of potassium carbonate are added successively in solid form in a jacketed reactor. The reactor was closed and inertized with nitrogen. Once the jacket temperature had attained 160° C., the stirrer was switched on at 50 rpm. Once the internal temperature had likewise attained 160° C., the reactor was heated slowly to 320° C. The reaction profile was observed via the torque which was determined from the power consumption by the stirrer motor. The torque rose after approximately 6 hours and, after a further about 2 hours, oscillated at a constant range approximately 55% above the starting level. The product was discharged, cooled with water and comminuted in a crusher. The residual moisture content in the comminuted reactor effluent was approximately 20% by weight.

Comparative Example 1

Prior Art; Reactor Discharge Dried to Constant Mass 5 kg of the comminuted, water-moist reactor effluent obtained above were dried to constant mass in a vacuum drying cabinet at 100° C. and approximately 100 mbar for 12 hours. Thereafter, the dried reactor effluent was transferred into a stirred suction filter, and subjected to two-stage washing ten times with 15 liters each time of ethanol (in each case 1 hour at 75° C.) and then ten times with 15 liters each time of deionized water (in each case 1 hour at 95° C.). The fourth of the 10 water washes was carried out here with 15 liters of 0.5% aqueous orthophosphoric acid.

The resulting purified PEEK was dried and analyzed for the impurities with AAS (atomic absorption spectroscopy), ICP-OES (inductively coupled plasma-optical emission spectroscopy) and elemental analysis.

| Na content: | 40 ppm |
| K content: | 5 ppm |
| S content: | 410 ppm |

Comparative Example 2

Prior Art; Reactor Effluent Dried to Constant Mass 5 kg of the comminuted, water-moist reactor effluent obtained above were dried to constant mass in a vacuum cabinet at 100° C. and approximately 100 mbar for 12 hours.

Thereafter, the dried reactor effluent was transferred to a stirred suction filter. Ethanol was introduced into the suction filter from the top; the suspension was stirred at room temperature for 15 minutes. Once the solid had settled out again, a total of 150 liters of ethanol were passed through the solid at 75° C. within 8 hours. Once this first drainage wash with ethanol had been completed, the procedure was repeated with water. In this case, water was introduced into the suction filter from the top and the suspension was stirred at 40° C. for 15 minutes. Once the solid had settled out again, first 75 liters of deionized water, then 10 liters of 0.5% aqueous orthophosphoric acid and then a further 75 liters of deionized water without interruption of the elution stream were passed through the solid at 95° C. within a total of 9 hours.

The resulting purified PEEK was dried and analyzed for the impurities with AAS, ICP-OES and elemental analysis.

| Na content: | 150 ppm |
| K content: | 4 ppm |
| S content: | 420 ppm |

Example 1

5 kg of the comminuted, water-moist reactor effluent obtained above were dewatered in a centrifuge at 1000 rpm. The residual moisture content after centrifugation was approximately 5% by weight. Thereafter, the dried reactor effluent was transferred into a stirred suction filter, and subjected to two-stage washing ten times with 15 liters each time of ethanol (in each case 1 hour at 75° C.) and then ten times with 15 liters each time of deionized water (in each case 1 hour at 95° C.). The fourth of the 10 water washes was carried out here with 15 liters of 0.5% aqueous orthophosphoric acid.

The resulting purified PEEK was dried and analyzed for the impurities with AAS, ICP-OES and elemental analysis.

| Na content: | 15 ppm |
| K content: | <1 ppm |
| S content: | 180 ppm |

Example 2

5 kg of the comminuted, water-moist reactor effluent obtained above were dewatered in a centrifuge at 1000 rpm. The residual moisture content after centrifugation was approximately 5% by weight. Thereafter, the dried reactor effluent was transferred to a stirred suction filter. Ethanol was introduced into the suction filter from the top; the suspension was stirred at room temperature for 15 minutes. Once the solid had settled out again, a total of 150 liters of ethanol were passed through the solid at 75° C. within 8 hours. Once this first drainage wash with ethanol had been completed, the procedure was repeated with water. In this case, water was introduced into the suction filter from the top and the suspension was stirred at 40° C. for 15 minutes. Once the solid had settled out again, first 75 liters of deionized water, then 10 liters of 0.5% orthophosphoric acid and then a further 75 liters of deionized water without interruption of the elution stream were passed through the solid at 95° C. within a total of 9 hours.

The resulting purified PEEK was dried and analyzed for the impurities with AAS, ICP-OES and elemental analysis.

| | |
|---|---|
| Na content: | 10 ppm |
| K content: | <1 ppm |
| S content: | 160 ppm |

Example 3

5 kg of the comminuted, water-moist reactor effluent obtained above were transferred into a suction filter and 10 liters of ethanol were poured over it, which for the most part washed off the surface moisture. Subsequently, the further procedure of Example 1 was followed.

The resulting purified PEEK was dried and analyzed for the impurities with AAS, ICP-OES and elemental analysis.

| | |
|---|---|
| Na content: | 10 ppm |
| K content: | <1 ppm |
| S content: | 120 ppm |

Example 4

5 kg of the comminuted, water-moist reactor effluent obtained above were transferred into a suction filter and 10 liters of ethanol were poured over it, which for the most part washed off the surface moisture. Subsequently, the further procedure of Example 2 was followed.

The resulting purified PEEK was dried and analyzed for the impurities with AAS, ICP-OES and elemental analysis.

| | |
|---|---|
| Na content: | 10 ppm |
| K content: | <1 ppm |
| S content: | 95 ppm |

The entire disclosure in German priority application DE 10 2006 022 442.6, filed May 13, 2006, is hereby incorporated by reference.

The invention claimed is:

1. A process for preparing a polyarylene ether ketone, comprising:
   a) reacting an aromatic dihalogen compound with a bisphenol and/or a halophenol in the presence of alkali metal carbonate and/or alkaline earth metal carbonate in a high-boiling aprotic solvent to give a polyarylene ether ketone,
   b) wet-comminuting the solidified reaction mixture of step a) in the presence of water, to obtain a wet-comminuted reaction mixture;
   c) washing the wet-comminuted reaction mixture of step b) with an organic solvent, to obtain a product,
   d) washing the product of step c) with water, to obtain a washed product, and
   e) drying the washed product,
   c) and d) being referred to as two-stage washing, wherein steps b), c) and d) are performed in this order,
   wherein the wet-comminuted reaction mixture is fed to the two-stage washing with a residual moisture content of 1 to 12% by weight; and
   wherein the polyarylene ether ketone has a Na content of at most 15 ppm, a K content of <1 ppm, and a S content of at most 180 ppm.

2. A process according to claim 1, wherein the high-boiling aprotic solvent comprises diphenyl sulfone.

3. A process according to claim 1, wherein the polyarylene ether ketone is a PEEK, a PEK, a PEKK or a PEEKK.

4. A process according to claim 2, wherein the polyarylene ether ketone is a PEEK, a PEK, a PEKK or a PEEKK.

5. A process according to claim 1, wherein the water wash includes a wash with a dilute acid.

6. A process according to claim 2, wherein the water wash includes a wash with a dilute acid.

7. A process according to claim 3, wherein the water wash includes a wash with a dilute acid.

8. A process according to claim 4, wherein the water wash includes a wash with a dilute acid.

9. A process according to claim 5, wherein the acid is selected from the group of hydrochloric acid, sulfuric acid, orthophosphoric acid, pyrophosphoric acid, polyphosphoric acid, metaphosphoric acid and phosphonic acid.

10. A process according to claim 6, wherein the acid is selected from the group of hydrochloric acid, sulfuric acid, orthophosphoric acid, pyrophosphoric acid, polyphosphoric acid, metaphosphoric acid and phosphonic acid.

11. A process according to claim 7, wherein the acid is selected from the group of hydrochloric acid, sulfuric acid, orthophosphoric acid, pyrophosphoric acid, polyphosphoric acid, metaphosphoric acid and phosphonic acid.

12. A process according to claim 8, wherein the acid is selected from the group of hydrochloric acid, sulfuric acid, orthophosphoric acid, pyrophosphoric acid, polyphosphoric acid, metaphosphoric acid and phosphonic acid.

13. A process according to claim 1, wherein the residual moisture content is at least 2% by weight.

14. A process according to claim 1, wherein the residual moisture content is at least 3% by weight.

15. A process according to claim 1, wherein the residual moisture content is at least 4% by weight.

16. A process according to claim 1, wherein the residual moisture content is at most 10% by weight.

17. A process according to claim 1, wherein the residual moisture content is 2 to 10% by weight.

* * * * *